(12) United States Patent
Doyen et al.

(10) Patent No.: US 9,253,458 B2
(45) Date of Patent: Feb. 2, 2016

(54) DIGITAL LIGHT PROCESSING DISPLAY DEVICE

(75) Inventors: Didier Doyen, La Bouexiere (FR); Pascal Bourdon, Le Grand Fougeray (FR); Thierry Borel, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 695 days.

(21) Appl. No.: 12/225,599

(22) PCT Filed: Mar. 29, 2007

(86) PCT No.: PCT/EP2007/053003
§ 371 (c)(1),
(2), (4) Date: Sep. 25, 2008

(87) PCT Pub. No.: WO2007/113195
PCT Pub. Date: Oct. 11, 2007

(65) Prior Publication Data
US 2009/0058875 A1     Mar. 5, 2009

(30) Foreign Application Priority Data
Apr. 3, 2006   (EP) ..................................... 06290545

(51) Int. Cl.
*G09G 5/02*      (2006.01)
*H04N 9/31*      (2006.01)
*H04N 5/913*     (2006.01)

(52) U.S. Cl.
CPC ............. *H04N 9/3197* (2013.01); *H04N 5/913* (2013.01); *H04N 9/3123* (2013.01); *H04N 2005/91392* (2013.01)

(58) Field of Classification Search
CPC .............. G09G 2310/0224; G09G 2310/0235; G09G 2320/0266; G09G 3/2022; G09G 2320/0233; G09G 2340/0435; G09G 3/3406; G09G 3/3648; G09G 5/02; G06T 19/00; G06T 11/001; G06T 15/005; G06T 3/40; G06T 9/001; G03B 21/00; G03B 21/14; G06F 21/60; G06F 21/10; G06F 21/30; G06F 21/88
USPC ........................................... 345/589, 684, 3.2
See application file for complete search history.

(56) References Cited

U.S. PATENT DOCUMENTS 6,549,240 B1 *   4/2003   Reitmeier ..................... 348/459
6,674,561 B2     1/2004   Ohnishi et al.

(Continued)

FOREIGN PATENT DOCUMENTS

EP    1237369    9/2002
EP    1301034    4/2003

(Continued)

OTHER PUBLICATIONS

Search Report Dated Jul. 23, 2007.

*Primary Examiner* — Ke Xiao
*Assistant Examiner* — Kim-Thanh T Tran
(74) *Attorney, Agent, or Firm* — Myers Wolin LLC

(57) ABSTRACT

The invention relates to a display device using the DLP (Digital Light Processing) technology. This invention is in the field of digital cinema and content protection, where camcorder acquisition followed by immediate illegal distribution creates important revenue losses for content owners. According to the invention, the addressing of the display device is modified in order to introduce an anti-copy processing. The display device comprises modulation means for modulating the color or brightness of video data of video pictures received at a first rate and for outputting at a second rate modulated video data, said second rate being a multiple of the first rate, subfield coding means for coding said modulated video data into subfield data, said subfield data being delivered at the second rate, and addressing means for addressing the array with said subfield data at a third rate. Advantageously, the third rate is not a multiple of the first rate.

14 Claims, 4 Drawing Sheets

(56) References Cited

U.S. PATENT DOCUMENTS

| | | | |
|---|---|---|---|
| 6,707,516 B1 * | 3/2004 | Johnson et al. ............... | 349/78 |
| 7,043,019 B2 | 5/2006 | Tehranchi et al. | |
| 7,050,076 B2 | 5/2006 | Nishi et al. | |
| 7,227,581 B2 * | 6/2007 | Correa et al. ................. | 348/447 |
| 7,304,656 B2 * | 12/2007 | Doyen et al. .................. | 345/691 |
| 7,470,032 B2 * | 12/2008 | Damera-Venkata et al. ... | 353/94 |
| 7,574,004 B2 | 8/2009 | Mihota | |
| 2002/0054031 A1 * | 5/2002 | Elliott et al. .................. | 345/204 |
| 2002/0168069 A1 * | 11/2002 | Tehranchi et al. ............. | 380/235 |
| 2004/0160406 A1 * | 8/2004 | Yamazaki et al. ............. | 345/100 |
| 2005/0052703 A1 * | 3/2005 | Pettitt et al. ................... | 358/3.19 |
| 2005/0195205 A1 | 9/2005 | Abrams, Jr. | |
| 2006/0061600 A1 * | 3/2006 | Beuker et al. ................. | 345/656 |
| 2007/0097334 A1 * | 5/2007 | Damera-Venkata et al. ... | 353/94 |

FOREIGN PATENT DOCUMENTS

| | | |
|---|---|---|
| JP | 2000259126 | 9/2000 |
| JP | 2002314938 | 10/2002 |
| JP | 2003110967 | 4/2003 |
| JP | 2004015742 | 1/2004 |
| JP | 2004525569 | 8/2004 |
| JP | 2004266345 | 9/2004 |
| WO | WO 01/33846 | 5/2001 |
| WO | WO 02/076107 | 9/2002 |
| WO | WO02076107 | 9/2002 |
| WO | 2007004366 | 1/2007 |

* cited by examiner

DIGITAL LIGHT PROCESSING DISPLAY DEVICE

This application claims the benefit, under 35 U.S.C. §365 of International Application PCT/EP2007/053003, filed Mar. 29, 2007, which was published in accordance with PCT Article 21(2) on Oct. 11, 2007 in English and which claims the benefit of European patent application No. 06290545.0, filed Apr. 3, 2006.

FIELD OF THE INVENTION

The invention relates to a display device using the DLP (Digital Light Processing) technology. This invention is in the field of digital cinema and content protection, where camcorder acquisition followed by immediate illegal distribution creates important revenue losses for content owners.

BACKGROUND OF THE INVENTION

Visual contents, be they still or moving images, are in general creations which benefit from copyright-related exclusivity guarantees. Their reproduction is in general permitted only within a strongly defined framework which allows for remuneration of authors and their beneficiaries.

In order to ensure that these legal rules are correctly adhered to, numerous systems have been develop to prevent illegal copies or sufficiently impair their quality as to render them unusable.

Within this framework, patent application EP 1 237 369 aims to combat the copying of images by picture-taking during their display, for example with a camcorder in a cinema auditorium. With this aim, it is proposed that the brightness of the pixels of a pattern be modulated around the value to be displayed at a frequency which renders the pattern invisible to the human eye but which generates artefacts on the sequence filmed by the camcorder. This pattern is commonly called anti-copy pattern. The shape of the pattern can be determined so as to inscribe messages of the type "ILLEGAL COPY" which will appear in the images displayed by the camcorder.

In order for the pattern to be invisible to the human eye, the modulation consists in alternating images in which the pattern is bright with images in which it is dark, the mean brightness of the pattern over several images corresponding to that to be displayed in the images in the absence of a pattern. During the display of these images, the eye carries out integration and in fact perceives the mean brightness. This technique may be also applied to the colour of the images by alternating images in which the pattern is more coloured with images in which it is less so, the mean colour of the pattern over several images corresponding to that to be displayed in the absence of the pattern.

In practice, each image of the initial sequence received at 24 Hz is decomposed into several images at N*24 Hz in which the brightness and/or the colour of some parts of the images are modulated to create the anti-copy pattern as indicated above.

SUMMARY OF THE INVENTION

As this anti-copy method has never been implemented in a DLP (Digital Light Processing) based display device, the goal of the present invention is to propose such a display device.

So, the present invention concerns a display device comprising an array of luminous element for displaying video pictures. It further comprises modulation means for modulating the colour or brightness of video data of pixels of video pictures received at a first rate and for outputting at a second rate modulated video data, said second rate being a multiple of the first rate, subfield coding means for coding said modulated video data into subfield data, said subfield data being delivered at the second rate, and addressing means for addressing the array with said subfield data at a third rate.

The modulation means are used for introducing an anti-copy pattern in the video pictures to be displayed as described hereinabove. So, the modulation means modulates at a modulation rate the colour or brightness of pixels of a pattern around values to be displayed. The modulation rate is advantageously half the third rate. The third rate is selected such that the modulation is imperceptible by the human eye but creates artifacts when the displayed video pictures are captured by a video capturing device such a camcorder.

In a preferred embodiment, the addressing of the array is not synchronized to the video data received in order to disturb the video acquisition with a camcorder. In that case, the third rate is not a multiple of the first rate.

Advantageously, the third rate varies dynamically during the displaying of the video pictures in order to increase the disturbance of the video acquisition.

The third varies for example between 120 Hz and 144 Hz. The change of the third rate is preferably made at sequence cuts.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

The principle of the addressing in a DLP based display device is given hereinafter. Such a DLP based display device is a Digital Micro-mirror Device (DMD). The state of a micro-mirror (which is an elementary cell of a DMD) is basically binary (ON or OFF). The physical principle of the micro-mirror is to reflect or not the light depending on a binary information related to the video. Each cell is a mirror which has two possible positions. In a first position, the cell is ON and the light is reflected in the right direction. In the other position, the cell is OFF and no light is reflected in the right position.

Figure 1:
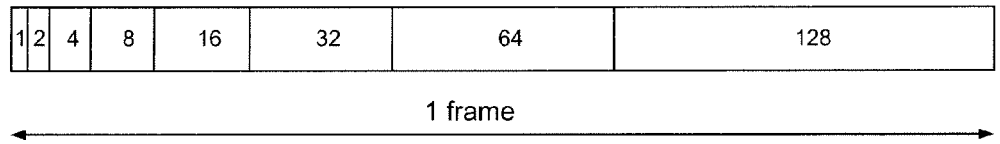
FIG. 1 illustrates the breakdown of a video frame into 8 sub-fields.

In order to render gray shades, the frame is split into several sub-fields. FIG. 1 illustrates 8 bit video information (256 levels) rendered with 8 sub-fields. For each of the sub-fields, each cell is addressed with a binary value. Then the value is latched at the same time for each cell and the cells remain unchanged until new video information is latched.

In order to render up to 256 levels, each cell of the DMD is addressed sequentially at least 8 times during the frame. The display duration of each sub-field is depending on the bit addressed. It is 128 times longer for the Most Significant Bit (bit 128) than for the Least Significant Bit (bit 1). The Least Significant Bit is corresponding to $1/255$ of the frame duration when the Most Significant Bit is corresponding to $128/255$. This scheme is generally called Pulse Width Modulation (PWM).

In order to avoid any temporal disturbance in the perception of motion picture, more than 8 sub-fields are used to render 256 levels. To this end, the sub-fields corresponding to the Most Significant Bits are split into several parts and displayed at different time locations within the frame. At the end, depending on the addressing speed of the display device, the 8 or 10 initial binary information can be represented by more than 40 or 50 sub-fields.

Figure 2:
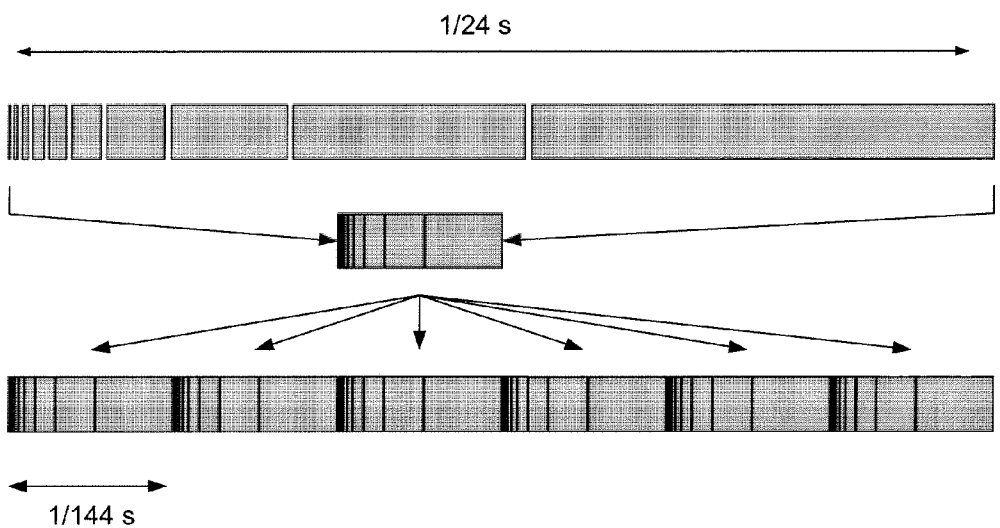
FIG. 2 illustrates the classical addressing scheme into a DLP based display device.

In the digital cinema, the addressing period for each picture is conventionally $1/24$ second. The addressing time of elementary binary information in a DLP display is around 10 µs which let assume the possibility of addressing a large number of binary information per picture. The goal of addressing a large number of binary information is to avoid if possible temporal artefacts due to the binary scheme. So, the same picture information is addressed several times within $1/24$s. FIG. 2 illustrates a frame split into 6 identical sub-frames. So the initial picture is split into 6 identical sub-pictures. The global duration of the frame is $1/24$ second and the duration of each sub-frame is $1/144$ second. So the required refresh frequency of the display device is 144 Hz. As the 6 sub-pictures are identical, they can be generated by reading 6 times the memory in which the video information of the picture to be displayed is stored.

Figure 3:
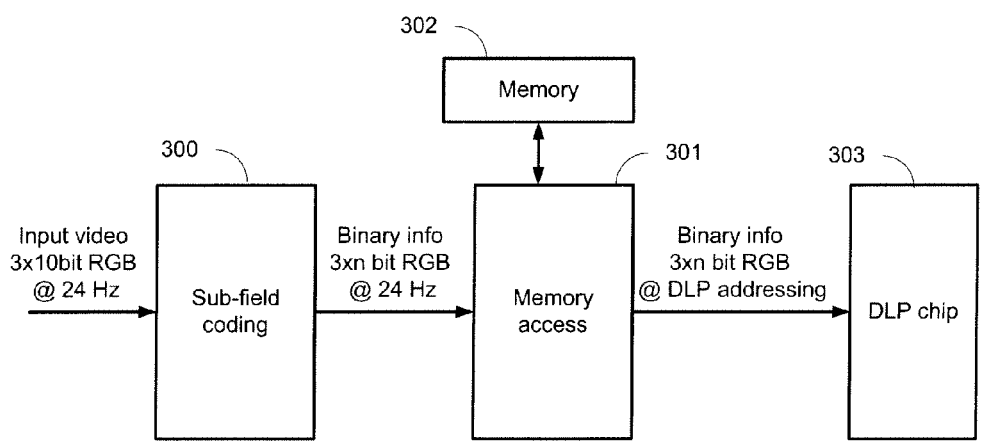
FIG. 3 represents a block diagram of the addressing scheme of the FIG. 2.

FIG. 3 illustrates the block diagram of today's DLP addressing. The input video 3×10 bits (10 bits for Red, 10 bits for Green, 10 bits for Blue) is converted by a sub-field coding block 300 into a binary data stream compatible with the PWM scheme of FIG. 2. Each binary data is related to the state (ON or OFF) of an elementary cell of the DLP chip 303. The input video is received at a rate of 24 Hz and the corresponding 10 bits information generated by the block is written once at the same rate by a memory access block 301 into a memory 302. The memory is for example a DDR-RAM. This memory is globally addressed at 24 Hz for the write operation and at the DLP addressing rate (for example 144 Hz) for the read operation. The read data are addressed to the DLP chip 303.

Figure 4:
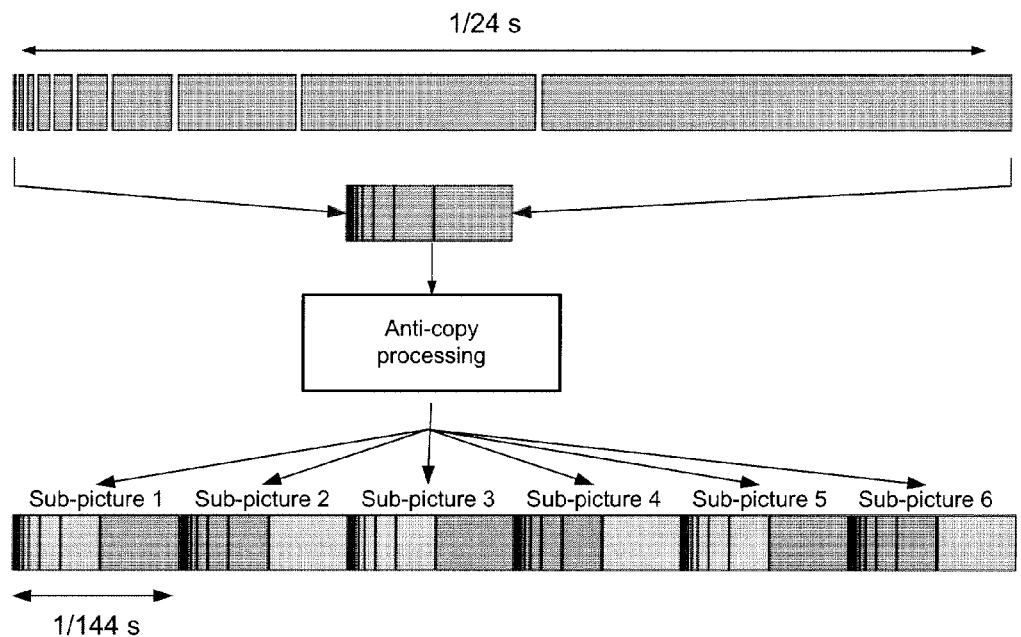
FIG. 4 illustrates an addressing scheme with anti-copy processing into a DLP based display device.

According to the invention, the addressing of the DLP display device is modified in order to introduce an anti-copy processing. Anti-copy processing is carried out by using at least two different sub-pictures in the frame as illustrated by FIG. 4. In the example of FIG. 4, the initial picture is split into 6 consecutive sub-pictures and these 6 sub-pictures correspond to three identical pairs of different sub-pictures. So the first, third and fifth sub-pictures are identical and the second, fourth and sixth sub-pictures are identical. Each pair of consecutive sub-pictures is determined to implement the anti-copy processing, i.e. the brightness and/or colour of the pixels of a pattern are different in the two sub-pictures of the pair but their mean value is equal to the value to be displayed. As these sub-pictures are displayed at a high rate (144 Hz), the pattern is invisible to the human eye but appears on the sequence when it is filmed by a camcorder. Of course, it is possible to use more than two sub-pictures to modulate the brightness/colour of the pixels of the pattern. The frame can also be split into a number of sub-frames different from 6.

Figure 5:
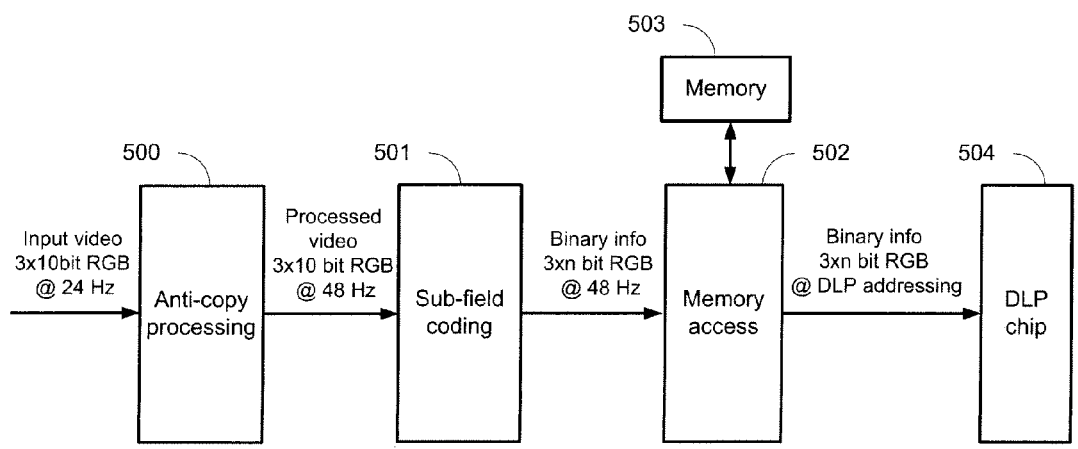
FIG. 5 represents a first block diagram of the addressing scheme of the FIG. 4.

FIG. 5 illustrates a possible block diagram of the addressing of a DLP projector carrying out the PWM scheme of FIG. 4. The input video 3×10 bits (10 bits for Red, 10 bits for Green, 10 bits for Blue) received at 24 Hz is first converted by an anti-copy processing block 500 into a processed video 3×10 bits at 48 Hz. The block 500 generates two sub-pictures from an initial picture. The two sub-pictures are different for some pixels representing the anti-copy pattern (for example, the pattern is a warning message) and are determined such that the anti-copy pattern is not visible to the human eye when said sub-pictures are displayed at a rate higher than a threshold frequency. This threshold frequency is about 60 Hz when the brightness of the pattern pixels is modulated and about 25 Hz when the colour of the pattern pixels is modulated. The processed video is then converted by a sub-field coding block 501 into a binary data stream compatible with the PWM scheme of FIG. 4. Each binary data is related to the state (ON or OFF) of an elementary cell of the DLP chip 504. The data stream generated by the block 501 is written once by a memory access block 502 into a memory 503. This memory is globally addressed at 48 Hz for the write operation and globally at the DLP addressing rate (for example 144 Hz) for the read operation. The read data are then addressed to the DLP chip 504 for the display of the sequence.

Figure 6:
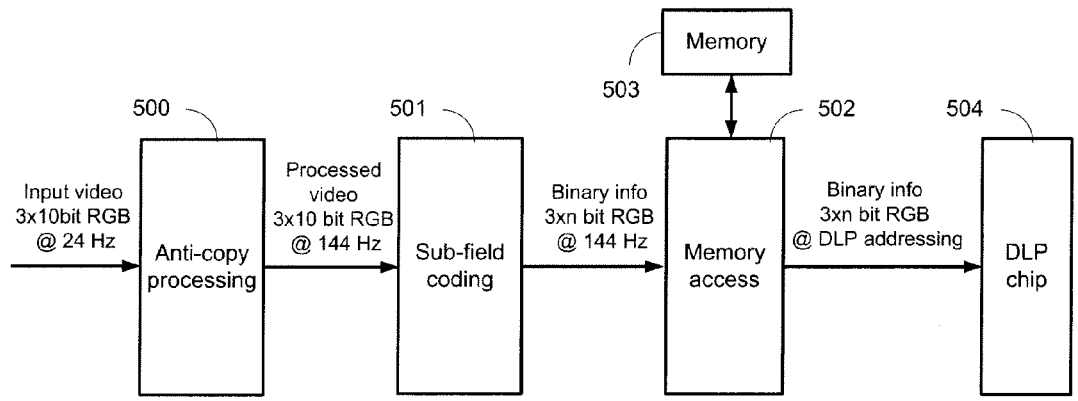
FIG. 6 represents a second block diagram of the addressing scheme of the FIG. 4.

If 6 different sub-pictures are used for the anti-copy processing, the anti-copy block 501 generates 6 different sub-pictures for each initial picture of the video input. These 6 sub-pictures are outputted by the block 500 at a frequency of 144 Hz as illustrated by the block diagram of FIG. 6.

In a preferred embodiment, the read operation of the memory 503 is made at a rate which is not a multiple of 24 Hz, i.e. the DLP addressing rate is equal to k*24 Hz in which k is not an integer, in order to disturb an illegal video acquisition by a camcorder. For example, k is comprised between 5 and 6, i.e. the read rate is comprised between 120 Hz and 144 Hz.

Figure 7:
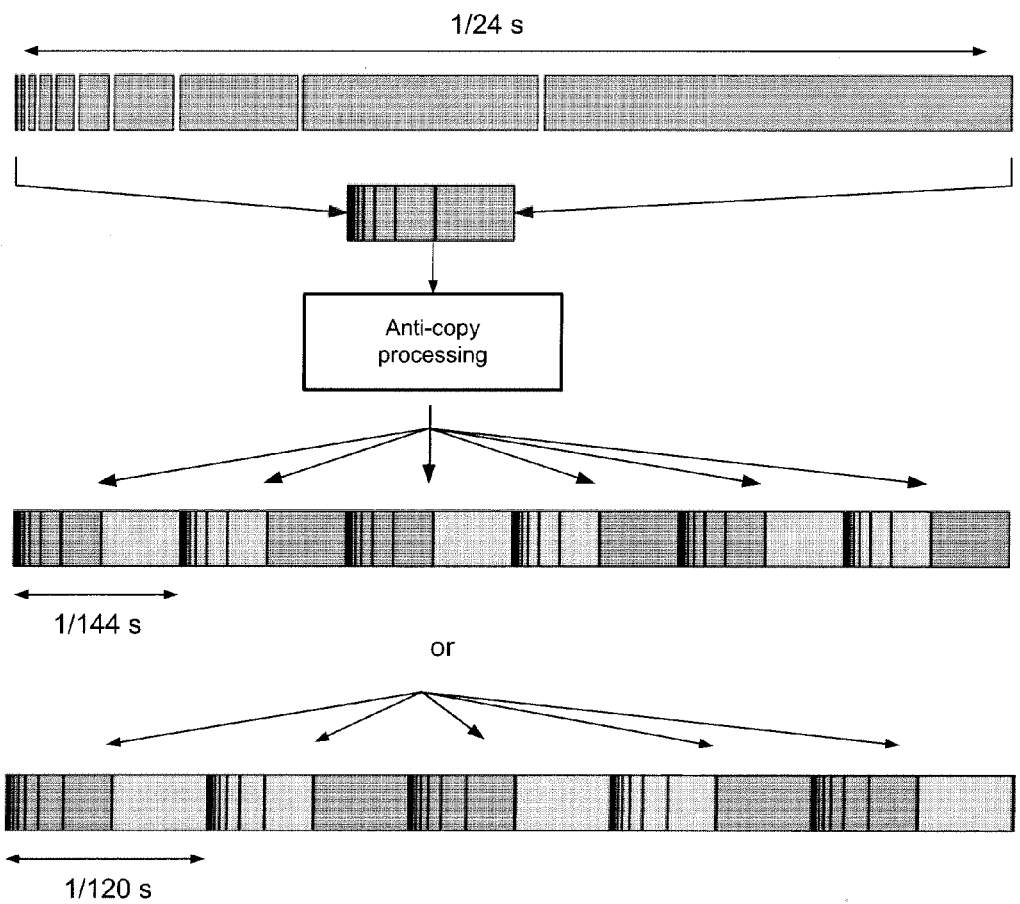
FIG. 7 illustrates an addressing scheme with anti-copy processing for two different values of refresh frequency of the display device.

FIG. 7 represent two addressing schemes where k=6 and k=5. In the first case, the sub-frame duration is $1/144$ second and in the second case, the sub-frame duration is $1/120$ second.

Figure 8:
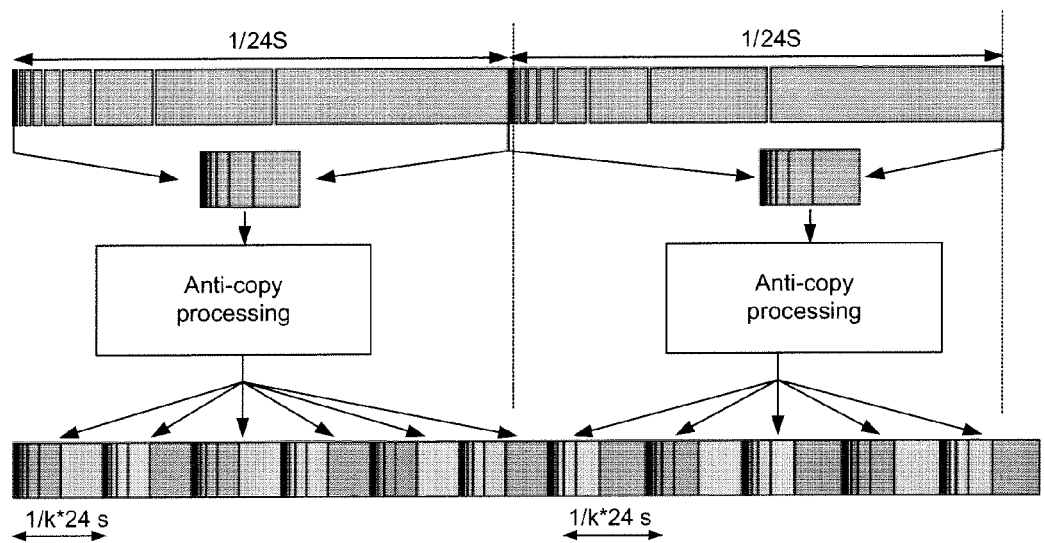
FIG. 8 illustrates an addressing scheme with anti-copy processing for a value of refresh frequency which is not a multiple of the input video frequency.

FIG. 8 illustrates the way to manage the addressing of the DLP chip with a rate between 120 Hz and 144 Hz. This figure shows two frames split into sub-frames. The duration of each subframe is 1/(k*144) second. The initial frames at $1/24$s are no more synchronized with the addressing scheme. The sub-frame which is addressed is the last one stored in the memory 503. Since 5<k<6, some frames are repeated 6 times (=6 sub-frames) like the first frame in FIG. 8 and some others are repeated 5 times (=5 sub-frames) like the second frame in FIG. 8.

In practice, it is very easy to modify precisely this refresh rate thanks to properties of the DLP. The switching time of an elementary time of an elementary cell of the DMD is around 10 µs. So, it is then possible to define addressing scheme with variable length. If k=6 the addressing time for 1 sub-frame is 6940 µs and 8330 µs for k=5. Any sub-frame duration in between will give 5<k<6.

The use of a variable value k which is not an integer optimizes the anti-camcorder in such a way that the content displayed in the DLP is no more synchronized with the video input. The variation of this k value make impossible a constant synchronization of the camcorder with the refresh frequency.

Judder effects can occur with such k*24 Hz addressing scheme since the number of sub-frames is not the same for all the input frames. This judder effect is clearly not very important since the same frame is already repeated 6 times without strong artifact in the today's DLP display device. The difference is that this number of sub-frames varies from one frame to the other one. This is the same principle as the 3-2 pull down mode for film in NTSC standard but it is strongly less visible than 3-2 pull down since we have 6-5 pull down. Anyway, to suppress any artifacts, it can be possible to make an interpolation of the last sub-frame displayed between the 2 adjacent frames.

To optimize again the anti-camcorder effect, the value is advantageously modified dynamically during the film projection. To avoid any visible artifact between two refresh rate values, the change of the value k is carried out at a cut in the video sequence. The change of the value k can be done progressively or not.

Advantageously, the anti-copy processing is more efficient when the modulation rate is half the frequency of the refresh rate. It is the case in FIGS. 5 and 6 where two different sub-frames are used to create the anti-copy pattern. The trade-off between modulation amplitude and visibility on legal picture is the best one for this modulation rate. It means that if the refresh rate is between 120 Hz and 144 Hz for instance, the modulation rate is between 60 Hz and 72 Hz.

The invention claimed is:

1. A method for displaying video pictures using an array of luminous elements, the method comprising:
   generating a plurality of video sub-pictures;
   modulating pixel information in a consecutive identical pair of the plurality of sub-pictures such that the consecutive identical pair is modulated to have different pixel patterns associated with brightness or color, while a mean value of the pixel information of the pair equals that of an image to be displayed, the different pixel patterns representing a message, when displayed at a threshold rate;
   converting the consecutive identical pair of the plurality of sub-pictures into a binary data stream configured to turn each element in the array of luminous elements on or off; and
   addressing the array of luminous elements using the binary data stream at said threshold rate,
   wherein the threshold rate changes from at least one video picture to a next video picture, such that an average of said threshold rate over successive video pictures is not an integer value.

2. The method according to claim 1, wherein the threshold rate is equal to one divided by a number of sub-pictures times twenty four hertz.

3. The method according to claim 2, wherein the plurality of sub-pictures is obtained from an input video signal received at an input rate lower than the threshold rate.

4. The method according to claim 2, wherein the threshold rate is selected such that the message represented by the different pixel patterns is imperceptible by a human eye but creates artifacts when the displayed video pictures are captured by a video capturing device.

5. The method according to claim 3, wherein the threshold rate is not a multiple of the input rate.

6. The method according to claim 1, wherein the threshold rate varies dynamically during display of the video pictures.

7. The method according to claim 1, wherein said luminous elements are micro-mirrors values.

8. A display device comprising an array of luminous element for displaying video pictures, the display device comprising:
   a memory;
   at least one processor configured to:
      generate a plurality of sub-pictures;
      modulating pixel information in a consecutive identical pair of the plurality of sub-pictures such that the consecutive identical pair is modulated to have different pixel patterns associated with brightness or color, while a mean value of the pixel information of the pair equals that of an image to be displayed, the different pixel patterns representing a message, when displayed at a threshold rate;
      convert the consecutive identical pair of the plurality of sub-pictures into a binary data stream configured to turn each element in the array of luminous elements on or off; and
      address the array of luminous elements using the binary data stream at said threshold rate,
   wherein said threshold rate changes from at least one video picture to a next video picture, such that an average of the threshold rate over successive video pictures is not an integer value.

9. The device according to claim 8, wherein the threshold rate is equal to one divided by a number of sub-pictures times twenty four hertz.

10. The device according to claim 9, wherein the at least one processor is further configured to obtain the plurality of sub-pictures from an input video signal received at an input rate lower than the threshold rate.

11. The device according to claim 9, wherein the at least one processor is further configured to select the threshold rate such that the message represented by the different pixel patterns is imperceptible by a human eye but creates artifacts when the displayed video pictures are captured by a video capturing device.

12. The device according to claim 8, wherein said luminous elements are micro-mirrors values.

13. The device according to claim 10, wherein the threshold rate is not a multiple of the input rate.

14. The device according to claim 8, wherein the threshold rate varies dynamically during the displaying of the video pictures.

* * * * *